United States Patent [19]
Loyzim

[11] 3,967,179
[45] June 29, 1976

[54] POWER SUPPLY FOR A STEPPING MOTOR

[75] Inventor: Robert J. Loyzim, Coventry, Conn.

[73] Assignee: The Superior Electric Company, Bristol, Conn.

[22] Filed: May 30, 1974

[21] Appl. No.: 474,671

[52] U.S. Cl. ............................................... 318/696
[51] Int. Cl.² ...................................... H02K 37/00
[58] Field of Search ..................... 318/138, 685, 696

[56] References Cited
UNITED STATES PATENTS

| | | | |
|---|---|---|---|
| 3,444,447 | 5/1969 | Newell | 318/696 |
| 3,662,245 | 5/1972 | Newell | 318/696 |
| 3,684,934 | 8/1972 | Loyzim | 318/696 |
| 3,746,959 | 7/1973 | Kobayashi et al. | 318/696 |
| 3,809,991 | 5/1974 | Loyzim | 318/696 |
| 3,824,440 | 7/1974 | McIntosh | 318/696 |

Primary Examiner—Gene Z. Rubinson
Attorney, Agent, or Firm—Ernest M. Junkins

[57] ABSTRACT

A stepping motor is energized by a power supply that supplies charges of power with the number and duration of the charges being controlled according to the current operating conditions of the motor. The charges are supplied to a capacitor across which the motor is connected for energization with the voltage developed across the capacitor being the voltage supplied the motor.

9 Claims, 2 Drawing Figures

POWER SUPPLY FOR A STEPPING MOTOR

The present invention has particular utility when used to supply power to a stepping motor whose movement is controlled by command pulses. Each pulse through a motor control means effects a change of energization of the motor windings to produce an incremental step. The step is essentially produced simultaneously with the appearance of the pulse so that the motor speed is solely controlled by the pulse rate. Further, in the absence of a pulse, the motor is held braked and stationary by maintaining the same windings energized that produced the last step.

As the motor is varied in speed from being stationary to many thousands of steps per second, its impedance varies and it has thus been found that if the voltage to the motor was maintained constant the effectiveness of the motor was limited by compromising between a low voltage need for standstill and a higher voltage need for high speeds. Some attempts to tailor the power supply to the operating characteristics of the motor have included using variable and/or fixed impedance devices which while somewhat effective were undesirably power consuming. Other attempts have included making the power supply have a plurality of circuits each of which produced different voltages for different operating conditions with one such attempt being described in my copending application Ser. No. 308,316, filed Nov. 21, 1972 now U.S. Pat. No. 3,809,991 and assigned to the assignee of the present invention. However, while these power supplies operated satisfactorily, they were somewhat power consuming, somewhat complex for many applications and sometimes difficult to modify for different operating conditions for different motors.

It is accordingly an object of the present invention to provide a power supply for a stepping motor which essentially minimizes power loss in the power supply by eliminating most power consuming devices and yet which is quite effective in controlling the power needed by the current operating status of the motor.

Another object of the present invention is to achieve the above result with a power supply which enables a motor to effectively operate over a wide speed range with a relatively fast response time to speed changes including acceleration and in which the value of the standstill power and hence braked force may be easily altered to a desired value to minimize power loss at standstill.

A further object of the present invention is to provide a power supply for a stepping motor which is relatively easily adjusted between different sizes of motors and different operating conditions and is reliable and durable in use.

In carrying out the present invention of a power supply for a stepping motor, there is provided input terminals that are connected to a source of direct current that preferably has an essentially constant voltage value with the value preferably being about the maximum that is to be impressed on the motor. Power is supplied therefrom to a capacitor which is connected across the power supply output terminals and to which the motor windings are connected so that the value of voltage across the capacitor is the value of voltage essentially supplied to the motor. Interposed between the input terminals and the capacitor is a conducting means that is normally non-conducting but which is rendered conducting by a conducting signal for the extent that the signal exists. In its conducting state, current is permitted to flow to the capacitor from the source to increase the charge thereon and hence the voltage impressed on the motor.

In the specific embodiment herein disclosed, the conducting signal is derived from two circuits, a holding circuit and a running circuit. The holding circuit effects conduction continuously and sets the minimum energy to the motor while the running circuit regulates conduction in accordance with the speed of the motor. Each circuit thus produces its own signal with the conducting signal being the combination of these two signals. Accordingly, for a condition where the motor is at standstill only the holding circuit controls the energy to the motor while for the condition where the motor is operating at a high speed, as for example, three thousand steps per second and higher, the running circuit causes the conducting means to be continuously conducting, thereby supplying essentially the voltage of the direct current source to the motor windings.

Other features and advantages will hereinafter appear.

In the drawing

Figure 1:
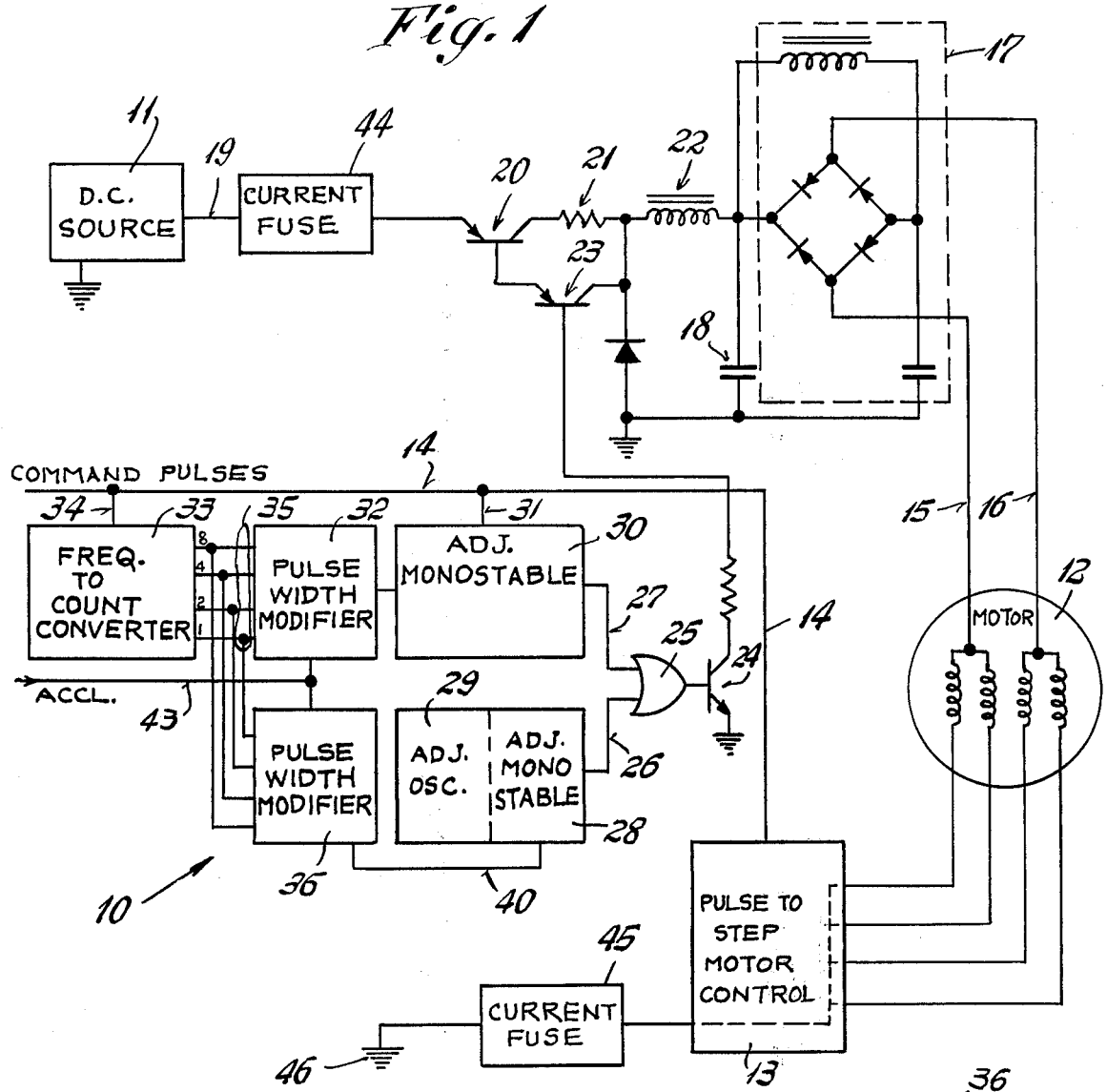
FIG. 1 is a block and electrical schematic diagram of the power supply of the present invention shown interconnected with a motor.

Referring to the drawing, the power supply of the present invention is generally indicated by the reference numeral 10 and is used to control energy from a D.C. source 11 to a stepping motor 12. The supply 10 is connected to receive command pulses on a lead 14 which is connected to the motor control 13 so that for each pulse received the control 13 changes the energization of the windings in the motor 12 in order to produce an incremental movement or step. As shown, the motor windings are also connected by leads 15 and 16 to a circuit enclosed within a dotted line 17 which provides paths for induced voltages caused by the changes of energization in the motor windings 12.

The power supply of the present invention controls the voltage across a capacitor 18 which voltage is essentially the voltage that is applied to the motor windings through the leads 15 and 16. For a more complete understanding of the circuit 17, motor 12 and motor control 13, reference is made to my U.S. Pat. No. 3,684,934, assigned to the assignee of the present invention and entitled "Stepping Motor Drive Circuit With Path For Induced Voltages."

A positive lead 19 from the D.C. source 11 is connected through a transistor 20, a resistor 21 and a smoothing inductance 22 to the positive side of the capacitor 18. With this structure, power is supplied from the D.C. source 11 to the capacitor 18 only when the transistor 20 is rendered conducting with the transistor 20 normally being non-conducting. Preferably the D.C. source 11 is essentially maintained at a constant value, such as 36 volts and with essentially continuous conduction of the transistor 20, the capacitor 18 will be maintained charged at essentially the same voltage which is also essentially the same voltage applied to the motor windings. If, of course, the transistor 20 is not rendered conducting then the voltage across the capacitor 18 will decay to essentially zero. By varying the ratio of conduction to non-conduction of the transistor 20, the value of the voltage across the capacitor 18 may accordingly be varied between these two extremes.

It will, of course, be understood that unless the motor control 13 is deenergized that it will maintain at least some of the windings of the motor 12 in condition for conduction, providing a path for the capacitor 18 to discharge.

The inductance 22 is essentially a smoothing choke for smoothing the abruptness of the change in conduction of the transistor 20 while the resistor 21 functions as a biasing voltage resistor for a transistor 23 connected to the base of transistor 20. The base of transistor 23 is connected in the emitter collector path of another transistor 24 which in turn has its base connected to the output of an OR gate 25 having a pair of inputs 26 and 27. Accordingly, if either or both of the leads 26 and 27 are in a "high" state then the transistor 24 conducts, transistor 23 conducts and hence the transistor 20 conducts. The extent of the conduction of the transistor 24 and naturally the transistor 20, is dependent solely upon the extent of the "high" state in either or both of the leads 26 and 27 with the transistor 20 being rendered non-conducting whenever and for the extent that both leads 26 and 27 have a simultaneous low state.

The lead 26 is connected to an output of an adjustable monostable 28 which in turn is actuated at a rate determined by an adjustable oscillator 29. The oscillator 29 and the monostable 28 constitute a holding circuit for providing the desired value of voltage across the motor when it is at a standstill and basically up to perhaps a low speed of a hundred or so steps per second. The oscillator 29 may be typically adjusted to a rate of perhaps several thousand Hz and the minimum pulse width of the monostable 28 be set to have the transistor 20 conduct perhaps 10 percent of the time to regulate the standstill power to the motor 12. It will be understood that by varying the rate of the oscillator and/or by adjusting the monostable minimum time that these values may be easily altered to the most efficient value of power that produces the desired standstill operation of a motor and be easily set for a different motor.

The lead 27 is connected to the output of an adjustable monostable 30 which also includes a connection 31 to the command pulse lead 14. Thus each time a command pulse appears, the monostable 30 assumes its unstable state making the lead 27 high and causing the transistor 20 to conduct for the extent of the unstable state. Accordingly, the capacitor 18 begins to be charged each time a change of energization of the motor windings occurs at essentially the same time that the change is initiated.

The extent of the unstable state of the monostable 30 is determined by a pulse width modifier 32 which is connected to a frequency to count converter 33 also having a connection 34 to the command pulse lead 14. The converter 33 senses the rate of the command pulses and by the group 35 of leads connected to the pulse width modifier 32 causes the modifier to act on the monostable 30 to alter the extent of the unstable state in accordance with the rate of the command pulses. Thus as the command pulses increase their rate, which increases the speed of the motor, the extent of the unstable state for each command pulse will also increase until at perhaps two to three thousand steps per second (or any other desired speed) the monostable 30 output is maintained continuously unstable so that the transistor 20 is thus continuously conducting.

While the extent of the monostable 28 pulses may be maintained constant, irrespective of motor speed, it has also been found that the energy supplied the motor could more nearly equal the needs of the motor for differing speeds if the extent of the monostable 28 pulses were also increased with speed. Thus, another pulse width modifier 36 is connected to the adjustable monostable 28 to also increase the duration of the unstable state of the monostable 28 pulses for each command pulse.

With such a holding circuit, the monostable 28 pulses may have an extent such that they would provide a ratio of conduction of up to 20 percent for a rate of command pulses that has the monostable 30 approach a nearly 100 percent unstable state. However, the unstable ratios are not simply additive as the monostable 28 unstable state is only operative during the stable or nonconducting causing duration of the monostable 30 output.

Figure 2:
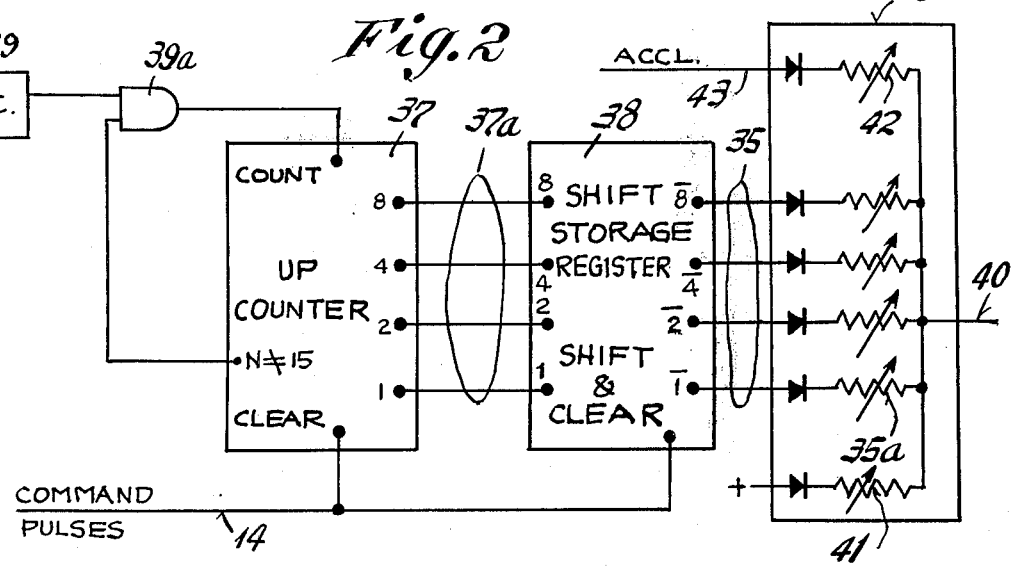
FIG. 2 is a block and schematic diagram of a portion of FIG. 1.

Referring to FIG. 2 which shows details of some heretofore mentioned components, the frequency to count converter 33 is composed of an up counter 37 and a shift storage register 38 together with an oscillator 39. The up counter has a maximum count of 15 and supplies on its output count leads 37a, a count of the number of oscillator pulses that are received during the time between adjacent command pulses. This count is supplied by the leads 37a to the left hand count terminals of the shift register storage 38 which also has right hand count terminals. Each command pulse functions to set the up counter 37 count to zero and also causes the shift storage register 38 to transfer and invert the count from its left hand count terminals to its right hand count terminals. The right hand terminals maintain this inverted count until the next command pulse appears. Thus, if the oscillator 39 is set, for example, to run at 3000 Hz the up counter 37 will count to the count of 5 for a command pulse rate of 600 and up to 15 (its maximum) for a command pulse rate of 200 or less. The count is expressed binarily and concurrently appears at the left hand count terminals of the shift storage register 38 and by the next command pulse, is shifted to the right hand count terminals to appear inverted on the leads 35 which are connected to the pulse width modifiers 32 and 36.

The pulse width modifiers 32 and 36 are essentially identical with only the modifier 36 being schematically shown in FIG. 2. Both function to provide an analog electrical value inversely related to the counter count, in order to control the extent of the monostables with the higher the count the shorter the unstable state. While a modifier may take many forms depending upon the electrical signal that is needed by the monostable, in the embodiment herein shown, it includes an adjustable resistor and a diode connected in parallel between each count terminal and a common output lead 40, one resistor being indicated by the reference numeral 35a. It will be noted that the connections thereof to the register 38 is to terminals that are the inverse of the count received by the register from the counter 37. Thus the lead 40 has its smallest value of voltage for the highest count of the counter. If desired, the modifier may include a resistor 41 for controlling the minimum extent of the monostable and preferably also includes a resistor 42 which is connected to an ACCL lead 43. The lead 43 accepts as a voltage, a command for the motor to accelerate and increases the extent of the unstable state of the monostables 30 and 28 beyond that which the counter count would provide so that more energy is supplied to the motor when it is being accelerated than normally the count would dictate.

An AND gate 39a is connected by way of one of its inputs and its output between the oscillator 39 and the count terminal while another input 39b is connected to an N ≠ 15 terminal of the counter. This gate causes the counter to maintain a count of fifteen for rates of command pulses that are equal to or less than one fifteenth of the oscillator rate.

It will be understood that the oscillator 39 may have a different rate for a different motor or application which in such an instance the up counter 37 would have different counts for the same rate of command pulses. Thus the rate of the oscillator 39 and/or the value of the resistors 35a may be changed in order to vary the quantity of energy supplied for each command pulse so that the power supply may thus be easily adapted to different motors and operating conditions.

A current fuse 44 is connected between the source 11 and the capacitor 18 while another current fuse 45 is connected between the ground 46 and the control 13. Both are preferably of the time delay type in which they open the circuit for a selectable delay upon the value of current through each exceeding a preselected value. For the fuse 44, the delay is set so that it plus the time required for the current flow to reach the preselected value, is somewhat longer than the shortest unstable time of the monostable 30. This fuse is particularly effective in limiting undesired current surges which normally could occur at low command pulse rates where the voltage difference between the source 11 and that at the capacitor 18 could be large. Further, the fuse 44 will naturally protect against abnormal input conditions. The fuse 45 basically protects for unusual conditions which includes not only short circuits but also excessive current that may occur when the motor is rapidly decelerated and functions as a generator and thus its delay time is made longer than the delay for the fuse 44.

It will accordingly be appreciated that there has been disclosed a power supply for a stepping motor in which the power to the motor is controlled in accordance with the current operating condition of the motor. Thus, at standstill, a holding circuit is employed to set the voltage across the motor at the value which not only the motor can tolerate but also that value which provides the desired braked force with the minimum power usage. As the motor is caused to move, the voltage is increased in accordance with the increasing rate of the command pulses until at a desired running speed of the motor essentially the entire value of voltage from a D.C. source is applied to the motor which continues thereafter for higher running speeds. One such desired speed may be 3000 steps per second even though the motor may be operated up to a maximum rate of 20,000 steps per second. By adjusting the extent of conduction for each command pulse, the power supplied may thus be set between these two extremes. Additionally, for acceleration, more power may be supplied than the command pulse rate would normally set.

Variations and modifications may be made within the scope of the claims and portions of the improvements may be used without others.

I claim:

1. A power supply for use with a stepping motor that produces an incremental movement for each change of energization applied thereto and a motor control circuit connected to receive input command pulses and change the energization of the motor for each pulse received with energy from the power supply, said power supply including input means connectible to a source of direct current, output means connected to supply the energy to the motor under the control of the motor control means and means for varying the ratio of the duration of the state of conduction to the duration of the state of non-conduction between the input means and the output terminals in accordance with the rate of the command pulses to thereby control the power transmitted to the motor and in which a duration of a state of conduction alternates with a duration of a state of non-conduction with there normally being at least one duration of each state for each input command pulse and in which the varying means includes a running circuit that includes means for receiving command pulses to sense the rate thereof and for increasing the duration of the state of conduction as the rate of the command pulses increases.

2. The invention as defined in claim 1 in which the varying means includes a holding circuit for maintaining a minimum ratio of the duration of the state of conduction to the state of non-conduction in the absence of a command pulse and including means for increasing the ratio of the duration of conduction to the duration of non-conduction at least for the lower rates of command pulses and in which the holding circuit includes an adjustable frequency oscillator for setting the rate of the alternating of the states' duration.

3. The invention as defined in claim 1 in which for rates of command pulses above a selected value, the means for varying causes the duration of the state of conduction to be maintained essentially continuously conducting.

4. The invention as defined in claim 1 in which the means for varying the duration of the state of conduction includes the combining of repeating small durations of the state of conduction and a duration of the state of conduction for each command pulse during motor movement.

5. A power supply for use with a stepping motor that produces an incremental movement for each change of energization thereto and a motor control circuit connected to receive input command pulses and change the energization of the motor for each pulse received with energy from the power supply, said power circuit including input means connectible to a source of direct current, output means connected to supply energy to the motor under the control of the motor control means, a capacitor connected across the output terminals and means for supplying energy to the capacitor from the direct current source in short bursts having durations that are related to the rate of the command pulses and in which the means for supplying energy includes supplying one burst for each command pulse and also rapidly repeating short duration bursts having a frequency that is greater than the ratio of the changes of energization during movement of the motor.

6. The invention as defined in claim 5 in which the means for supplying energy causes the durations of the bursts to be effectively continuous to thereby essentially connect the capacitor to the direct current source for at least one operating rate of the motor.

7. The invention as defined in claim 5 in which there are means for receiving an acceleration signal and means for increasing the duration of the bursts during the presence of the signal.

8. The invention as defined in claim 5 in which there are fuse means connected between the source and the capacitor, said means upon sensing a selected value of current flow stopping the flow of current for a selected time interval.

9. The invention as defined in claim 8 in which each command pulse produces a current burst having a predetermined minimum duration and in which the delay has a duration which prevents further current flow in the predetermined minimum duration.

* * * * *